US006145535A

United States Patent [19]

Louchart, III

[11] Patent Number: 6,145,535

[45] Date of Patent: Nov. 14, 2000

[54] AIR PRIORITY VALVE FOR A COMPRESSED AIR SUPPLY SYSTEM

[75] Inventor: Theophile Henry Louchart, III, Roebuck, S.C.

[73] Assignee: Michelin Recherche et Technique S.A., Switzerland

[21] Appl. No.: 09/315,297

[22] Filed: May 20, 1999

[51] Int. Cl.$^{7}$ ........ F16K 31/128

[52] U.S. Cl. ........ 137/487.5; 137/14; 137/118.06

[58] Field of Search ........ 137/14, 118.06, 137/119.1, 456, 458, 487.5

[56] References Cited

U.S. PATENT DOCUMENTS

| | | | |
|---|---|---|---|
| 4,069,292 | 1/1978 | Herrington et al. | 137/487.5 |
| 4,620,561 | 11/1986 | Brewer . | |
| 4,813,492 | 3/1989 | Biek | 137/456 |
| 4,913,181 | 4/1990 | Mortenson . | |
| 5,065,793 | 11/1991 | Stephenson et al. . | |
| 5,131,227 | 7/1992 | Iseman . | |
| 5,165,233 | 11/1992 | Betz . | |
| 5,209,255 | 5/1993 | Dehio . | |
| 5,687,759 | 11/1997 | Tan | 137/489 |
| 5,782,260 | 7/1998 | Jacobs et al. . | |

*Primary Examiner*—Gregory L. Huson
*Assistant Examiner*—Ramesh Krishnamurthy
*Attorney, Agent, or Firm*—Martin Farrell; Alan A. Csontos

[57] ABSTRACT

A priority valve for a compressed air system in a tire retreading plant includes a solenoid controlled, diaphragm operated valve connected at an inlet to an autoclave. A solenoid controls whether the valve is opened or closed. A switch has a pressure sensor connected to an inlet side. If the pressure falls below a low pressure limit, the switch activates the solenoid to close the valve, thus shutting off the air supply to the autoclave. With the inlet to the autoclave closed, the air compressor is able relatively quickly and easily to raise the pressure in the system above the low pressure limit. The valve remains closed until the sensed pressure rises to a value sufficient to supply both the other equipment and the autoclave.

9 Claims, 2 Drawing Sheets

AIR PRIORITY VALVE FOR A COMPRESSED AIR SUPPLY SYSTEM

BACKGROUND AND SUMMARY

In precure tire retreading operations, a precured tread is applied on a layer of uncured gum rubber to the crown of a buffed and prepared tire casing or carcass. This assembly is held in an autoclave at an elevated pressure and temperature so that the gum rubber layer cures and bonds to the carcass and tread, thus forming a retreaded tire.

A problem in the operation relates to bringing the autoclave to operating pressure during start up. Autoclaves are large containers that require a large volume of compressed air upon starting to reach operating pressure. For example, one commercially available autoclave with a 25 tire capacity has an interior volume of about 905 cubic feet or 6800 gallons. Even after taking into account the volume displaced by the tire assemblies placed in the autoclave, the remaining empty space is quite large. Charging the autoclave with compressed air to operating pressure conditions places a high demand on the compressed air supply at start up of the unit.

In a hybrid retread plant, both precure retread methods, also known as "cold" retreading, and uncured retreads methods, so-called "hot" or mold cure retreading, are used. In mold cure retreading, the replacement tread is not precured, that is, the tread is uncured rubber not formed with the tread pattern. The uncured rubber and carcass assembly are placed in a mold where the tread is molded to the proper form and the tread and gum layer are cured. The mold is typically charged with a heated fluid, such as water, to apply pressure to the assembly. Pressurized air is used to operate the lifting assembly for the mold. The buffers, the equipment that strips the worn tread from the casing, and the builders, the equipment that applies the gum and new tread to the buffed casing, are the same as those used in the precured operation, and consume compressed air for operation. Other equipment includes lifting devices and other devices that help move the tires from station to station in the plant.

A retreading plant typically has a single system to supply compressed air to both the autoclave and all the compressed air-driven equipment in the plant, the buffers and builders and other equipment. Depending on the capacity of the plant, several buffers and builders will be provided. The supply system typically includes a compressor and an accumulator.

At start up, the autoclave intake opens, connecting the large autoclave volume to the compressed air supply. The inlet remains open until the autoclave reaches operating pressure, which, depending on the capacity of the compressed air system, can take several minutes, typically 10 to 15 minutes. The autoclave demand for compressed air is instantaneous, however, and is typically much higher than what the compressor and accumulator can instantly supply. As a result, compressed air is drawn away from the rest of the system, starving the other equipment. The air pressure available to the other equipment therefore falls below the required operating air pressure for the equipment, and the other equipment does not function properly. This results in lost operating time while the autoclave fills, or worse, can result in damage or loss of the tire carcasses being worked on by the equipment because of improper functioning.

Conventional solutions to this problem are costly. A dedicated compressor and accumulator with dedicated supply lines can be provided, but requires both a large expense to purchase the equipment and for operation and maintenance of a separate system. Alternatively, additional compressors and accumulators that activate during autoclave load demand, or larger compressors and accumulators sufficient to meet the usual system demand and the autoclave demand can be provided. These solutions also involve large expenses in purchase, operation and maintenance.

The present invention provides a low-cost, reliable and simple solution that can be applied to existing equipment, without additional compressors or accumulators.

According to the invention, a priority valve system is connected in the compressed air line to monitor and control the flow of compressed air to the autoclave. The inventor realized that the autoclave can fill over an extended period of time without harming performance. The performance of other equipment, to the contrary, is harmed by changes in air pressure. The system prioritizes the compressed air flow to ensure that air at a pressure sufficient to operate the other operating equipment is available during the time the autoclave is filling. If the pressure in the supply line falls below a low pressure limit, air to the autoclave is shut off until the compressor can raise the air pressure above the low pressure limit.

Thus, according to the invention, the supply of compressed air is prioritized to ensure a continuous supply to the equipment other than the autoclave. The autoclave is supplied only when the compressed air supply exceeds the amount need to operate the other equipment. The other equipment remains operable even when the autoclave is being filled, and equipment down time and damage to carcasses are avoided. When no other equipment is being operated, the priority valve can allow a steady flow of compressed air to the autoclave with few, if any, interruptions.

As will be understood by those skilled in the art, the invention can be applied to any compressed air supply system having one or more devices that require immediate, large volumes of compressed air in a way that strains the supply system. In addition, the invention may be used in a system to provide a margin of safety to a critical piece of equipment to protect that equipment from a sudden loss of pressure.

According to a preferred embodiment, the priority valve system includes a solenoid controlled, diaphragm operated valve connected at an inlet to the autoclave. A solenoid controls whether the valve is opened or closed. A switch has a pressure sensor connected to an inlet end of the valve to sense pressure. If the pressure falls below a low pressure limit, the switch activates the solenoid to close the valve, thus shutting off the air supply to the autoclave. With the inlet to the autoclave closed, the compressor is able relatively quickly and easily to raise the pressure in the system above the low pressure limit. The valve remains closed until the sensed pressure rises to a value sufficient to supply both the other equipment and the autoclave.

The switch is a pressure differential switch having a low set point and a high set point. The low set point is set for the low pressure limit below which the air pressure is not sufficient to operate the other equipment. The high set point is established at a point where there is sufficient compressed air to supply both the autoclave and the other equipment.

Another advantage of the invention is that the demand on the compressor is spread out over a longer period of time, which can permit a single compressor to meet the demand. In addition, peak load and operation time for the compressor are reduced, which reduces maintenance requirements.

BRIEF DESCRIPTION OF THE DRAWINGS

The invention will become better understood with reference to the following detailed description in conjunction with the attached drawings, in which.

DETAILED DESCRIPTION

Figure 1:
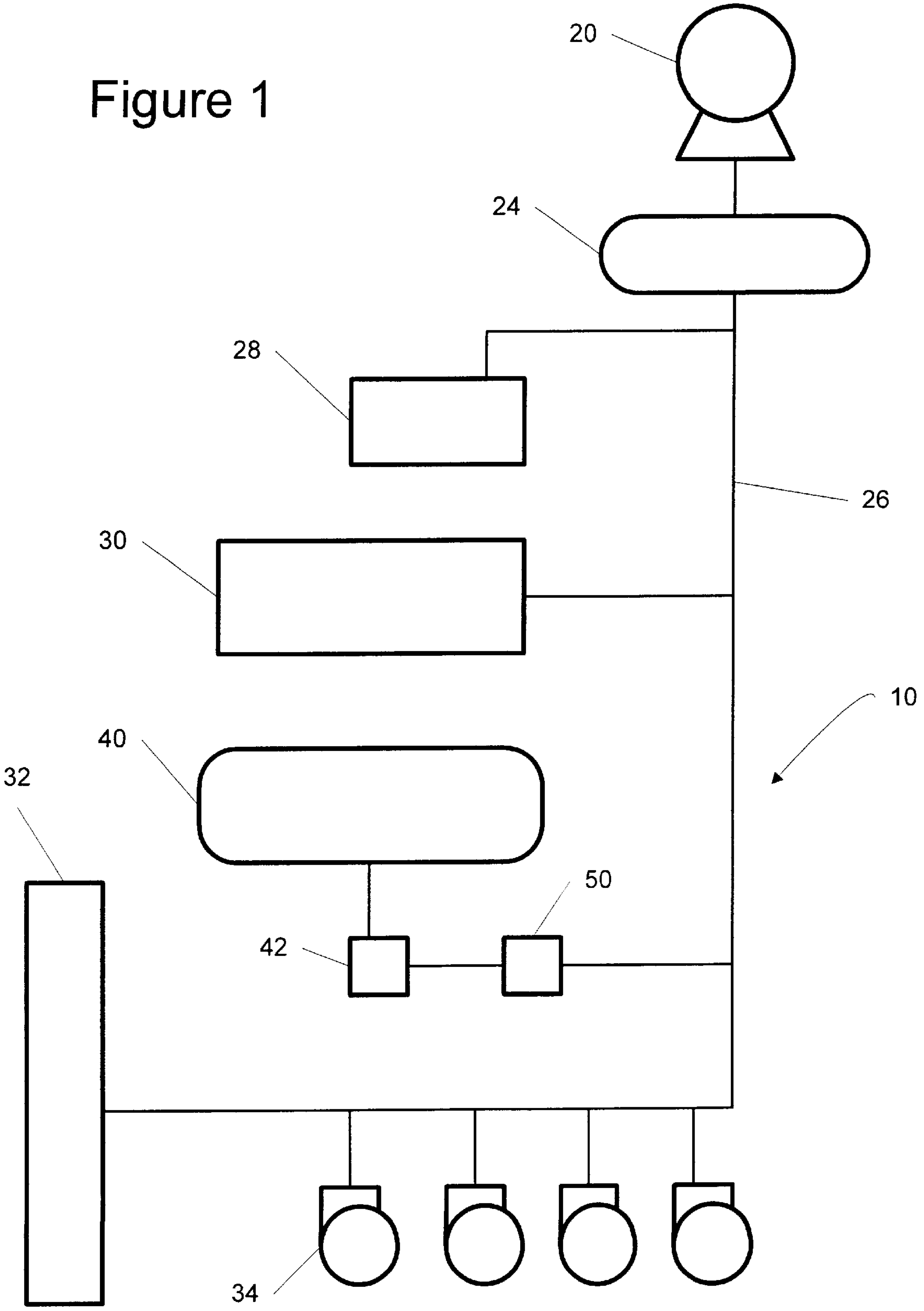
FIG. 1 is a schematic of a retreading plant compressed air supply including a priority valve in accordance with the invention.

FIG. 1 is a schematic of a hybrid retreading plant having a compressed air system 10 including a priority valve 50 in accordance with the invention. The compressed air system 10 includes a compressor 20 connected to deliver compressed air to an accumulator 24. The accumulator 24 stores compressed air to help meet plant demand for compressed air while maintaining a relatively constant pressure in the system. Depending on the needs of the plant, a second compressor (not illustrated) could be provided to supplement the first compressor during peak load times, and/or as a backup in case of a failure of the first compressor.

A supply line 26 carries compressed air from the compressor 20 and accumulator 24 to the plant's compressed air consuming equipment. The hybrid retread plant will typically include one or more buffers 28 that removes worn tread from a tire carcass, and one or more builders 30 that apply new precured tread to a buffed carcass.

The plant also includes a mold cure system, including a builder 32 that applies an uncured tread to a buffed tire carcass, and several molds 34 in which the assembly of uncured tread and tire carcass are cured.

On the precure retread side, an autoclave 40 is also connected to the supply line 26. The autoclave 40 is a large heat and pressure controlled vessel in which tire assemblies are held under elevated pressure and temperature to cure a bonding gum layer between the carcass and precured tread. As an example, an autoclave available from Cure Tech with a capacity of 25 tires has an interior volume of about 905 cubic feet or about 6800 gallons.

The autoclave 40 is typically at ambient pressure and temperature when started and must be brought to operating conditions of about 80 psi and 150° C., which requires charging the autoclave 40 with compressed air and heating. The autoclave 40 is provided with a pressure controlled inlet valve 42 which opens to allow compressed air into the autoclave and closes when operating pressure is reached. A control panel, not illustrated, provides an interface for an operator to start the autoclave 40. As will be understood by those skilled in the art, when the inlet valve 42 of the autoclave 40 is opened to charge the autoclave, the large volume at atmospheric pressure creates a huge immediate demand for compressed air, drawing much of the air present in the system. An autoclave of the size mentioned can require 10 to 15 minutes to reach operating pressure.

With conventional systems, the demand by the autoclave draws so much compressed air away from the other equipment connected to the system that insufficient air is available to operate the other equipment, for example, the buffers and builders, during autoclave start up. A sudden drop in air pressure will cause the operating equipment to function improperly, if at all. If a tire is being worked on a buffer, for example, a drop in air pressure can cause the buffer to shift and damage the tire, rendering the carcass useless for retreading.

The inventor realized that while the autoclave's demand at start up for compressed air was immediate, the actual need was not immediate. The autoclave could be allowed to wait until compressed air is available without negatively affecting the autoclave's performance. The other equipment, on the other hand, is much more sensitive to changes in pressure, and needs to be protected from changes in pressure.

The priority valve 50 installed upstream of the autoclave inlet valve 42 protects the other equipment by shutting off the compressed air flow to the autoclave 40 if the available air is not sufficient to operate the compressed air driven equipment. The priority valve 50 senses pressure at the inlet side of the valve 50, and closes if the pressure falls below a set minimum level, as explained in greater detail below. With the priority valve 50 closed, the system air is made totally available to the operating equipment. The priority valve in accordance with the invention does not act by regulating flow or restricting flow to the autoclave, which are not reliable for ensuring adequate pressure to the other equipment. Rather, compressed air flow to the autoclave is stopped if a minimum pressure level in the system is not attained.

Figure 2:
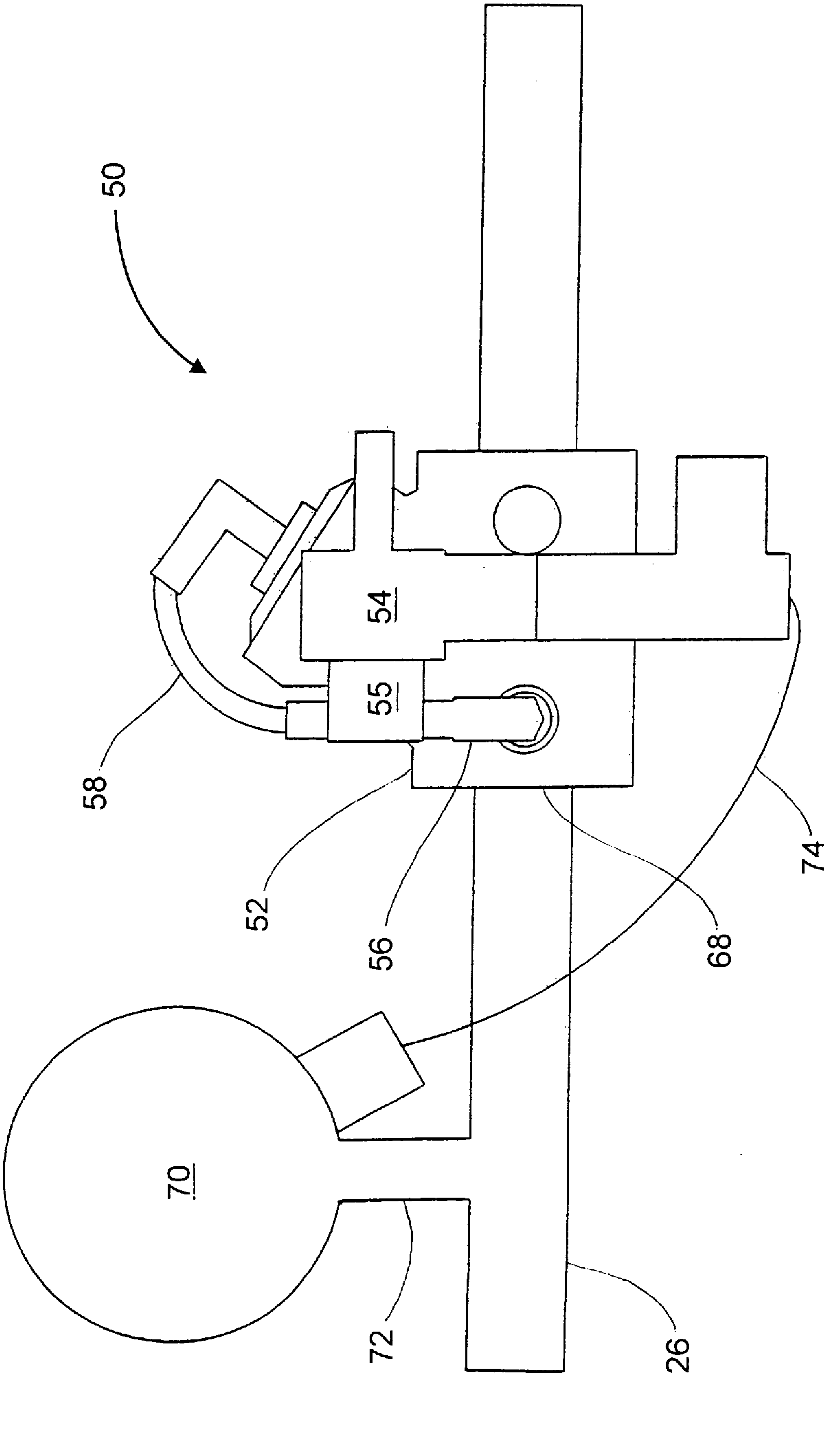
FIG. 2 is a schematic of a priority valve device in accordance with the invention.

FIG. 2 illustrates schematically a priority valve 50 according to the invention. The priority valve 50 includes a valve 52 having an open and a closed position. According to a preferred embodiment, the valve 52 is a diaphragm operated, solenoid controlled valve, such as the Series AM 4500 available from AquaMatic, Inc. The valve 52 is normally open with the solenoid 54 energized. Pressurized air is directed by the solenoid 54 by means of a solenoid valve 55 through tubes 56, 58 to position the diaphragm to open or close the valve. A suitable solenoid is the model C4H470 available from Parker Solenoid.

A switch 70 is connected to the air supply 26 upstream of the valve 52 to receive in formation about the pressure in the inlet side 68 of the valve. The switch 70 is also connected to the solenoid 54 by power cable 74 to energize or de-energize the solenoid based on the sensed pressure. The switch 70 can be set with a value representing a minimum acceptable pressure at the valve inlet 68 to ensure adequate pressure to the operating equipment. If the sensed pressure is below the minimum acceptable system pressure, the switch 70 causes the solenoid 54 to close the valve 52, which for the described solenoid is by de-energizing it.

According to a preferred embodiment of the invention, the switch is a pressure differential switch that stores two pressure values, a lower value and an upper value. The lower value corresponds to the minimum acceptable pressure for the operating equipment and is used to de-energize the solenoid and close the valve 52. The upper value corresponds to a system pressure above the adequate to supply the autoclave with compressed air without starving the other equipment. The upper value is used to energize the solenoid and open the valve 52.

A suitable switch is the Model DA-31-153-7 mercury switch available from Mercoid Division of Dwyer Instruments, Inc. A tube 72 connects the switch 70 to the inlet 68 of the valve 52, and conducts pressurized air to the switch. The switch 70 is calibrated to respond to pressure changes within limits set by a high and a low pointer.

The actual value of the low and high pressure limits depends on the configuration of the overall retread plant system, for example, the number of operating machines and the length of piping, and must be determined for each installation, which can be by trial and error, or more rigorously, by calculation of the system pressure values during operation.

When the autoclave is initially started, the priority valve will cycle frequently closing and opening, as the large, uncharged volume in the autoclave will place a high demand on the system. As the pressure in the autoclave increases, the demand eases and the priority valve will cycle less frequently.

The invention has been described in terms of preferred embodiments, principles and structure. The invention is not limited strictly to what is described, however, and those skilled in the art will understand that substitutions, equivalents, and alterations can be made without departing from the scope of the invention as defined in the following claims.

What I claim is:

1. A device for prioritizing consumption of a compressed air supply between an autoclave and at least one compressed air operated apparatus, comprising:

a valve connectable at an inlet to the autoclave having an open position and a closed position;

activating means for setting the valve selectively in one of the open and closed positions;

a pressure sensor connected to an inlet side of the valve for sensing air pressure in the inlet and generating a signal responsive to the sensed air pressure;

a switch for controlling the activating means connected to receive the signal from the pressure sensor, and responsive to the signal, to close the valve when the sensed air pressure is below a reference value representing a sufficiently high air pressure to operate the at least one apparatus and to open the valve when the sensed air pressure is above the reference value.

2. The device as claimed in claim 1, wherein the valve is a diaphragm valve being normally open.

3. The device as claimed in claim 2, wherein said activating means is a solenoid connected for being energized by the switch, and being connected to control the diaphragm for opening and closing the valve.

4. The device as claimed in claim 1, wherein the switch is a differential pressure switch having a low set pressure and a high set pressure above the low set pressure, the low set pressure comprising the reference value, wherein the switch closes the valve when the sensed air pressure is below the low set pressure, and opens the valve when the sensed air pressure is at least the high set pressure.

5. A compressed air supply system with air supply prioritizing, comprising:

a compressor for compressing air;

an accumulator for storing compressed air connected to receive compressed air from the compressor;

a supply line connected to the accumulator to deliver compressed air;

an autoclave connected to the supply line to receive compressed air;

at least one compressed air-operated device external to the autoclave connected to the supply line to receive compressed air; and a prioritizing valve connected in the supply line at an inlet to the autoclave, the valve having means for selectively positioning the valve in one of an open position and a closed position, a pressure sensor disposed in an inlet side of the valve to sense air pressure, and a switch responsive to the pressure sensor for activating the positioning means to close the valve if the sensed air pressure is below a reference value and to open the valve if the sensed air pressure is above the reference value, wherein, the reference value is a predetermined pressure value for the supply line sufficiently high to supply sufficient compressed air to operate the at least one compressed air-operated device.

6. The device as claimed in claim 5, wherein the prioritizing valve is a diaphragm valve being normally open.

7. The device as claimed in claim 6, wherein said activating means is a solenoid connected for being energized by the switch, and being connected to control the diaphragm for opening and closing the valve.

8. The device as claimed in claim 5, wherein the switch is a differential pressure switch having a low set pressure and a high set pressure above the low set pressure, the low set pressure comprising the reference value, wherein the switch closes the valve when the sensed air pressure is below the low set pressure, and opens the valve when the sensed air pressure is at the high set pressure.

9. A method for prioritizing a compressed air supply in a system including an autoclave and at least one compressed air-operated device, comprising the steps of:

opening a prioritizing valve at an inlet to the autoclave to fill the autoclave;

sensing a compressed air pressure at the inlet to the autoclave;

comparing the sensed pressure to a reference low pressure and a reference high pressure, said reference low pressure being sufficiently high to ensure an adequate supply of compressed air for operating the at least one compressed air-operated device connected to the compressed air supply;

closing the prioritizing valve if the sensed pressure is below the reference low pressure to allow the pressure at the inlet to increase to the reference high pressure; and opening the prioritizing valve when the sensed pressure is equal to the reference high pressure to allow compressed air to flow to the autoclave.

* * * * *